United States Patent
Ruiz Rodríguez et al.

(10) Patent No.: US 12,356,536 B2
(45) Date of Patent: Jul. 8, 2025

(54) APPARATUS AND METHOD FOR POWDER SPHEROIDISATION BY MICROWAVE-INDUCED PLASMA

(71) Applicant: FUNDACIÓ EURECAT, Cerdanyola del Vallès (ES)

(72) Inventors: Alberto Ruiz Rodríguez, Barcelona (ES); Francisco Javier Planta Torralba, El Masnou (ES); Raffaele Caminati, Vilassar de Mar (ES)

(73) Assignee: FUNDACIÓ EURECAT, Cerdanyola del Vallès (ES)

( * ) Notice: Subject to any disclaimer, the term of this patent is extended or adjusted under 35 U.S.C. 154(b) by 268 days.

(21) Appl. No.: 18/035,173

(22) PCT Filed: Nov. 5, 2021

(86) PCT No.: PCT/EP2021/080779
§ 371 (c)(1),
(2) Date: May 3, 2023

(87) PCT Pub. No.: WO2022/096647
PCT Pub. Date: May 12, 2022

(65) Prior Publication Data
US 2023/0422385 A1    Dec. 28, 2023

(30) Foreign Application Priority Data
Nov. 6, 2020 (EP) ..................................... 20382965

(51) Int. Cl.
*H05H 1/28* (2006.01)
*B22F 1/065* (2022.01)
(Continued)

(52) U.S. Cl.
CPC ............ *H05H 1/4622* (2021.05); *B22F 1/065* (2022.01); *B22F 1/142* (2022.01); *H05H 1/28* (2013.01)

(58) Field of Classification Search
CPC ........ H05H 1/4622; H05H 1/28; B22F 1/065; B22F 1/142
See application file for complete search history.

(56) References Cited

U.S. PATENT DOCUMENTS

| | | |
|---|---|---|
| 2014/0131906 A1 | 5/2014 | Hadidi et al. |
| 2014/0287162 A1 | 9/2014 | Jordan et al. |

(Continued)

FOREIGN PATENT DOCUMENTS

| | | |
|---|---|---|
| WO | WO 2019/246242 A1 | 12/2019 |
| WO | WO 2020/127565 A1 | 6/2020 |

OTHER PUBLICATIONS

International Search Report and Written Opinion mailed Mar. 18, 2022 for International Patent Application No. PCT/EP2021/080779; 13 pages.

*Primary Examiner* — Henry Luong
(74) *Attorney, Agent, or Firm* — Squire Patton Boggs (US) LLP

(57) ABSTRACT

An apparatus for powder spheroidisation by microwave-induced plasma comprises a microwave generator, a microwave cavity, a waveguide connecting the microwave generator to the microwave cavity, a plasma tube partially located in the microwave cavity, a powder supply connected to the plasma tube to feed a powder precursor flow thereinto, a gas supply connected to the plasma tube to feed a process gas flow thereinto, in order to form a plasma torch in the plasma tube by coupling the process gas flow with the microwave radiation, and a compressed air supply. The microwave cavity comprises at least one opening for the compressed air so that the latter can cool the plasma tube (Continued)

from outside, and the gas supply is connected to the powder supply to let the process gas carry the powder precursor into the plasma tube, and so into the plasma torch in order to make spheroids from the powder precursor by in-flight melting.

20 Claims, 3 Drawing Sheets

(51) Int. Cl.
  *B22F 1/142* (2022.01)
  *H05H 1/46* (2006.01)

(56) References Cited

U.S. PATENT DOCUMENTS

2014/0342093 A1  11/2014  Hadidi et al.
2020/0314991 A1* 10/2020  Duanmu .............. B23K 37/003

* cited by examiner

APPARATUS AND METHOD FOR POWDER SPHEROIDISATION BY MICROWAVE-INDUCED PLASMA

CROSS-REFERENCE

This application is a National Stage filing under 35 U.S.C. § 371 of International Patent Application No. PCT/EP2021/080779, filed Nov. 5, 2021, which claims priority to and the benefit of the European Patent Application No. 20382965.0 filed on Nov. 6, 2020, the contents of all of which are hereby incorporated by reference in their entireties for all purposes.

The present disclosure relates to an apparatus for powder spheroidisation by microwave-induced plasma. Such an apparatus comprises a microwave generator, a microwave cavity, a waveguide connecting the microwave generator to the microwave cavity, a plasma tube partially located in the microwave cavity, a powder supply connected to the plasma tube to feed a powder precursor flow thereinto, a gas supply connected to the plasma tube to feed a process gas flow thereinto, in order to form a plasma torch in the plasma tube by coupling the process gas flow with the microwave radiation.

The present disclosure further relates to a method to make spheroids from a powder precursor by means of a microwave-induced plasma, comprising the step of forming a plasma torch in a plasma tube by coupling a process gas flow with a microwave radiation.

BACKGROUND

The requirement of powders spheroidisation comes from different industrial fields, from powder metallurgy to electronic packaging. The need for an industrial process to yield spherical powder particles comes from seeking some of the following benefits resulting from the spheroidisation process:
  Improve the powders flowability.
  Increase the powders packing density.
  Eliminate powder internal cavities and fractures.
  Improve the surface morphology of the particles.

Spheroidisation is a process of in-flight melting. The powder precursor of angular shape (often from waste materials) is carried into an induction or microwave-induced plasma and is melted immediately in the high temperatures of plasma. The melted powder particles assume a spherical shape under the action of the surface tension of the liquid state. These droplets are cooled down when they fly out of the plasma torch. The resulting spheroids are thus collected as the spheroidisation products.

A microwave-induced plasma is a type of plasma that has high frequency electromagnetic radiation in the GHz range. It is capable of exciting electrodeless gas discharges.

US 2014/287,162 A1 discloses a microwave plasma apparatus for processing a material. The apparatus includes a plasma chamber, a microwave radiation source, and a waveguide to guide microwave radiation from the microwave radiation source to the plasma chamber. A process gas flows through the plasma chamber and the microwave radiation couples to the process gas to produce a plasma torch. A process material is introduced to the plasma chamber, becomes entrained in the plasma torch, and is thereby transformed to a stream of product material droplets. A pressurized source supplies a shrouding gas to the plasma chamber in order to establish a substantially laminar flow of the shrouding gas in a helical manner between the process gas and the inner surface of the plasma chamber. After ignition of the plasma torch, the swirling flow of the shrouding gas prevents the plasma jet from adhering to the inner surface, and thereby prevents melting of the plasma chamber by conductive heat transfer between the plasma torch and the inner surface. The shrouding gas also removes a portion of the heat transferred by radiation from the plasma torch to the inner surface. The shrouding gas also aids in maintaining laminar flow of the process gas.

However, the use of a shrouding gas to protect the plasma chamber is complicated and expensive.

SUMMARY

It is an object of the present disclosure to provide an apparatus and a method that overcomes or mitigates the drawbacks of the art.

In a first aspect, an apparatus is provided to procure powder spheroidisation by means of a microwave-induced plasma. The apparatus comprises a microwave generator, a microwave cavity, a waveguide connecting the microwave generator to the microwave cavity, a plasma tube partially located in the microwave cavity, a powder supply connected to the plasma tube to feed a powder precursor flow thereinto, a gas supply connected to the plasma tube to feed a process gas flow thereinto, in order to form a plasma torch in the plasma tube by coupling the process gas flow with the microwave radiation, and a compressed air supply, wherein the microwave cavity comprises at least one opening for the compressed air so that the latter can cool the plasma tube from outside, and the gas supply is connected to the powder supply to let the process gas carry the powder precursor into the plasma tube, and so into the plasma torch in order to make spheroids from the powder precursor by in-flight melting.

The fact that the plasma tube is refrigerated with air simplifies the apparatus and makes it, and its operation, cheaper. Also, the fact that the refrigeration is external to the plasma tube allows a superatmospheric pressure in the microwave cavity (the superatmospheric pressure being provided by the compressed air), thus preventing a powder leak otherwise produced by any crack in the plasma tube.

Besides, by virtue of the plasma tube being externally refrigerated with compressed air, a refrigeration tube enclosing the plasma tube can be dispensed with. Moreover, since the refrigerating air cools the plasma tube form the outside, said air cannot mix with the process gas, thus preventing contamination of the plasma torch.

Therefore, the present apparatus is cheaper, safer and easier to maintain.

In a second aspect, a method to make spheroids from a powder precursor by means of a microwave-induced plasma comprises the step of forming a plasma torch in a plasma tube by coupling a process gas flow with a microwave radiation, and further comprises the steps of:
  carrying the powder precursor into the plasma torch by means of the process gas acting as a carrier gas, in order to make spheroids from the powder precursor by in-flight melting;
  cooling the plasma tube from outside by injecting compressed air into a microwave cavity that surrounds the plasma tube.

The expression "a microwave cavity that surrounds the plasma tube" does not mean that the microwave cavity encompasses the plasma tube completely, as it is to be understood that there are parts of the plasma tube that extend outside the microwave cavity, both upstream and downstream from the microwave cavity.

There is no need to use the process gas to refrigerate the plasma tube 3 because the refrigeration function is left to the compressed air.

Further advantages, properties, aspects and features of the present disclosure may be derived from the below-described examples. The above-described features and/or the features disclosed in the claims and/or in the following description of examples can, if required, also be combined with one another even if this is not expressly described in detail.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
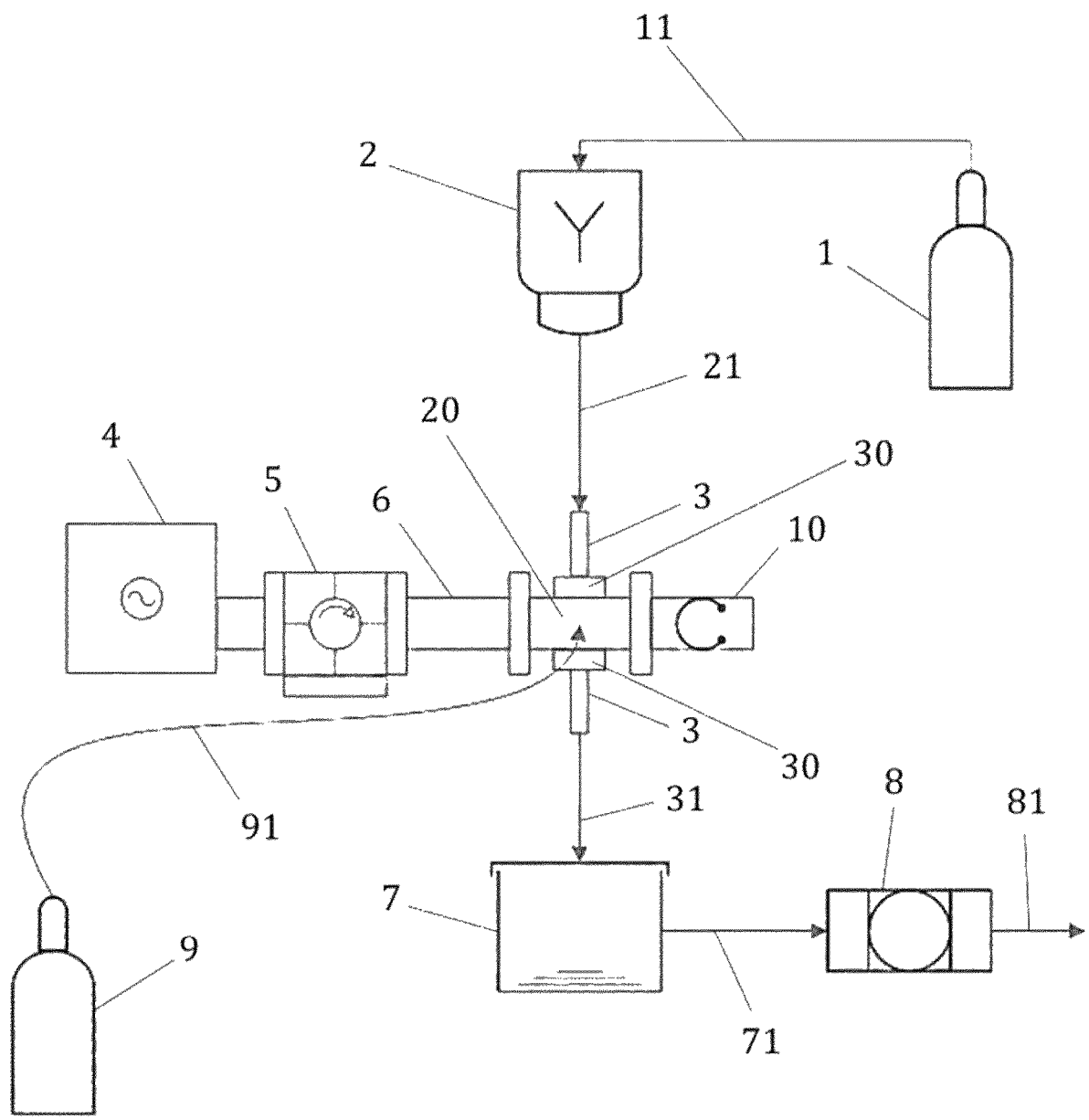
FIG. 1 is a schematic view of an apparatus for powder spheroidisation.
Figure 2:
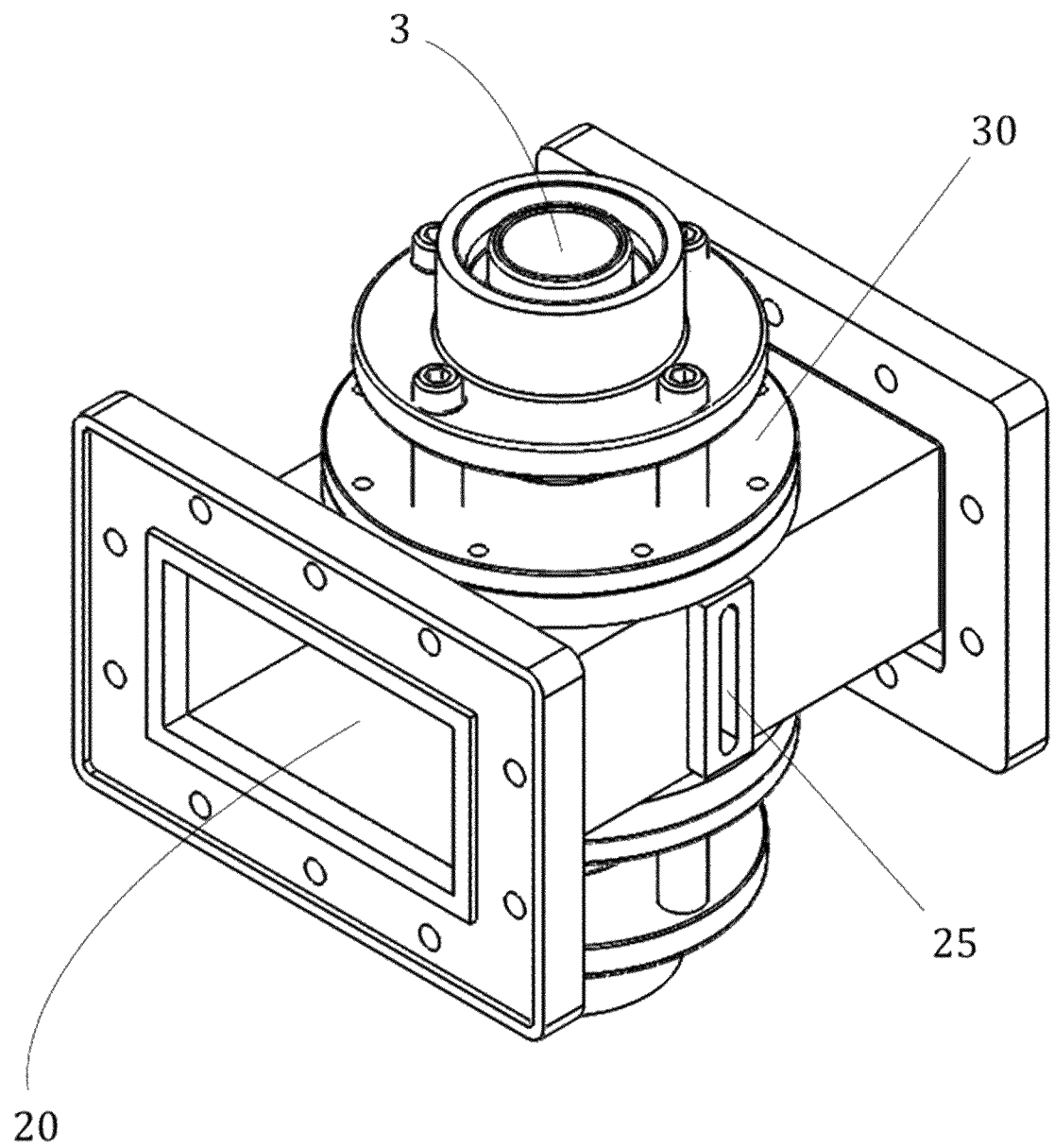
FIG. 2 is a perspective view of a microwave cavity crossed by a plasma tube.
Figure 3:
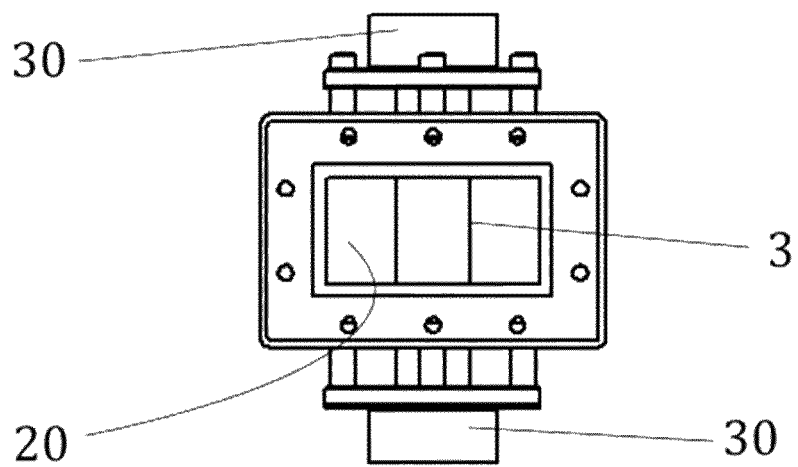
FIG. 3 is an elevation view of the microwave cavity of FIG. 2.
Figure 4:
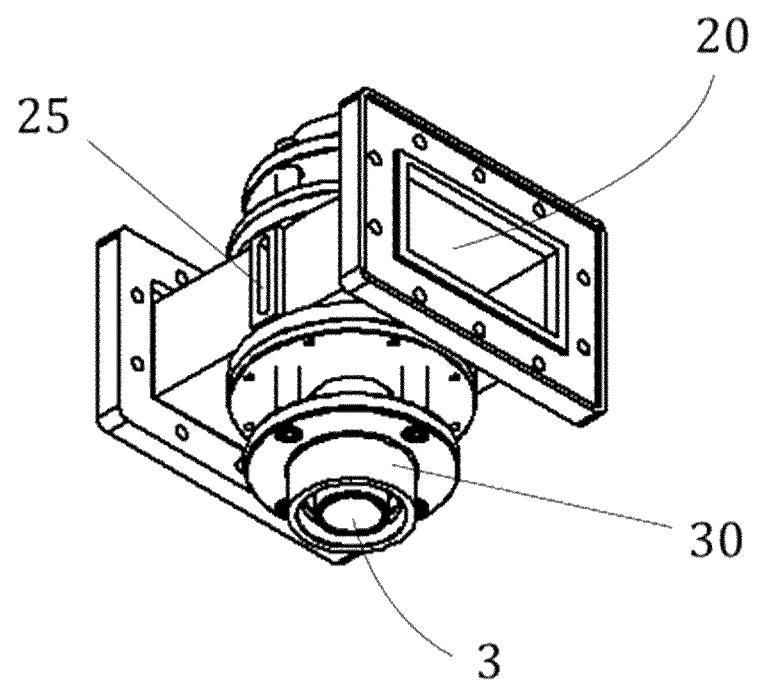
FIG. 4 is another perspective view of the microwave cavity of FIG. 2.

An exemplary apparatus for powder spheroidisation by microwave-induced plasma comprises a tank 1 with a compressed process gas 11, a tank 2 with an irregular powder precursor, a plasma tube 3 (or confinement tube, or discharge tube, or plasma chamber), a microwave generator 4, a microwave circulator 5, a waveguide 6, a receptacle 7 for the powder spheroids 31, a filter 8 to intercept the powder exiting the receptacle 7, a tank 9 with compressed air 91, a waveguide short circuit 10, and a microwave cavity between the waveguide 6 and the waveguide short circuit 10.

There may a wall transparent to microwave radiation between the waveguide 6 and the microwave cavity 20 or between the waveguide short circuit 10 and the microwave cavity 20. Any of these walls can be made of mica.

The powder precursor and the process gas are mixed in the tank 2 and the process gas carries the mixture 21 into the plasma tube 3.

The circulator 5 protects the microwave generator 4. The waveguide 6 and the waveguide short circuit 10 convey the microwave radiation into the microwave cavity 20, which is crossed by the plasma tube 3. A plasma torch is created in the plasma tube 3 by coupling the process gas flow 21 (carrying the powder precursor) with the microwave radiation that resonates in the microwave cavity. The plasma torch is ignited by a consumable electrode (not shown in the figures) or by any suitable means.

Compressed air 91 from tank 9 is introduced though at least one groove 25 in the microwave cavity 20 to cool the plasma tube 3 from outside. Other grooves may be provided on the waveguide 6 or the waveguide short circuit 10 to introduce more compressed air in the microwave cavity.

Receptacle 7 collects the mixture 31 of gas and powder spheroids exiting the plasma tube 3 (and the plasma torch therein). The powder spheroids are left in receptacle 7 to cool down and the gas exits the receptacle as a mixture 71 still having some small powder particles. Filter 8 intercepts this small powder particles and provides clean gas 81 to be reused as process gas.

Among the powder materials that can undergo the present spheroidisation process are wolfram or tungsten carbide, the melting point of which is about 2800° C., and also bronze, bronze-nickel, iron, aluminium, steel, iron-tin, etc. The present spheroidisation process can also be applied to ceramic materials.

Both the powder precursor particles and the powder spheroids are of the order of microns.

The process gas can be helium, argon, nitrogen, etc.

The wall of the plasma tube 3 can be made of quartz (but also of ruby or boron nitride), or at least the wall of the tube part inside the microwave cavity 20. The compressed air can impact that part of the plasma tube, so it is preferred that the temperature of the compressed air is not lower than 10-15° C., in order not to harm the tube material.

The present apparatus can be applied directly to a machine for surface treatment in order to put some processing steps together.

It is advantageous that the flow of the process gas is laminar or near laminar, in order to keep the powder particles on a given path. The present apparatus achieves a laminar enough flow and, at any rate, a process gas flow that is not turbulent because, among other factors, the gas entrance into the plasma tube 3 is devoid of obstacles and the surfaces involved present little or no roughness. The carrier gas (i.e. the process gas) and the precursor powder are mixed at a certain distance from the plasma tube, not less than 1 m. Typically, the flow rate is between 3 and 30 l/min, which normally gives a relatively low Reynolds number. Besides, the inner surface of the tube leading to the plasma chamber is smooth and its cross-section is constant. The aim is not a perfectly laminar flow but a flow without turbulences, which would impair the plasma. Typical length for the tube leading to the plasma chamber is between 1 and 3 m, preferably between 2 and 2.5 m, in order to avoid turbulences.

The present apparatus and process allow for processing small quantities of powder, for example about 2 kg, which is ideal for laboratories. Regarding the quantity of powder to be processed, the aim is to reach an equilibrium between microwave power, gas flow rate and mass of precursor powder in order to achieve the desired transformation percentage. Other things being equal, more microwave power implies more powder transformation.

The present process can yield a performance of 70%-80% of powder spheroidising. Generally speaking, it is possible to get better performances by employing different carrier gases, increasing microwave power, using an automatic system to match the impedance of the apparatus "in hot" and instantaneously, etc. Such an automatic system to adjust the impedance at every moment would seek a better operating point whenever the process gas or the precursor powder should change in nature or quantity. This is often done manually and so it is slow and nor very efficient, whereby it is customary to start the process with an equilibrium point and let it at that during the whole process. It has been found experimentally that a nitrogen gas mixture yield better results as a process gas, and by adding some 5-15% of hydrogen, the quantity of free electrons would increase and the capacity of melting the precursor powder would consequently increase. In plasma, energy is provided by the release of electrons from the process gas (without oxygen there can be no combustion). Other ways to increase the reacting capacity of plasma, such as optimizing the waveguide, increasing the microwave power, using other gas mixtures, etc, are not ruled out.

The microwave generator 4 can work at a relatively low power, e.g. less than 1 kW, since plasma ignition occurs from 0.6 kW. In general, microwave generators can operate from 10% of their full power on. However, the higher the power, the bigger the plasma torch because more electrons are released from the process gas, but care is needed in order to prevent the torch from reaching the tube wall, since, for instance, the melting point of quartz is 1100° C., whereas the melting point of the powder precursor can be as high as 2200° C. or higher, and the temperature inside the plasma torch should be at least this high.

The length of the plasma tube 3 can be varied according to necessity, although, as explained above, it is important to keep a constant tube cross-section in order not to disturb the process gas flow. A short plasma tube is more robust that a long one. Besides, the plasma tube 3 only needs to be transparent to microwave radiation inside the microwave cavity 20; outside the microwave cavity the tube can be made of a less transparent material. If, for any reason (such as allowing the spheroids to cool down), the tube 3 has to be lengthened, several short tubes can be joined taking care of making smooth junctions and of keeping a constant cross-section; of course this also applies to joining tube parts of different materials. A quartz tube is suitable for laboratory experiments but less so in the industry, due to the fragility of the quartz material. To overcome this drawback, the plasma tube 3 can be made of quartz inside the microwave cavity 20 (since quartz is transparent to microwave radiation) and can be completed with joined parts (intended to extend upstream and downstream from the microwave cavity) made of another material or other materials having greater mechanical strength, such as steel, stainless steel, aluminum, copper or any other metal or material resistant to heat. Actually, the parts of the plasma tube 3 that extend outside the microwave cavity 20 can be made of any material able to resist the heat conducted thereto from the quartz tube located inside the microwave cavity; the junction or connection between the quartz tube part and the adjoining tube parts should be mechanical, since an adhesive bonding would not withstand the heat involved.

By virtue of the plasma tube 3 being externally refrigerated inside the microwave cavity 20, there is no need for an outer refrigerating tube enclosing the plasma tube.

By virtue of being just one single tube, the plasma tube 3 can be readily replaced.

The plasma tube 3 is bi-directional, that is, the gas and powder mixture fed into the plasma tube can enter it from any end thereof.

The present apparatus allows for the processing of filamentary material, not just powder material, by simply replacing the power tank 2 with a feeder suitable for wire.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

The invention claimed is:

1. An apparatus for powder spheroidisation by microwave-induced plasma, comprising a microwave generator, a microwave cavity, a waveguide connecting the microwave generator to the microwave cavity, a plasma tube partially located in the microwave cavity, a powder supply connected to the plasma tube to feed a powder precursor flow thereinto, a gas supply connected to the plasma tube to feed a process gas flow thereinto, in order to form a plasma torch in the plasma tube by coupling the process gas flow with a microwave radiation, and a compressed air supply, wherein the microwave cavity comprises at least one opening for compressed air so that the compressed air can cool the plasma tube from outside, and the gas supply being connected to the powder supply to let the process gas carry the powder precursor into the plasma tube, and so into the plasma torch in order to make spheroids from the powder precursor by in-flight melting.

2. The apparatus according to claim 1, wherein the waveguide comprises at least one opening for the compressed air.

3. The apparatus according to claim 2, comprising a waveguide short circuit connected to the microwave cavity, the waveguide short circuit in turn comprising at least one opening for the compressed air.

4. The apparatus according to claim 1, wherein at least one of the air openings is a groove.

5. The apparatus according to claim 4, wherein the groove is parallel to the axis of the plasma tube.

6. The apparatus according to claim 1, wherein the plasma tube is composed of at least three different tube parts, including a part located inside the microwave cavity, a part located upstream from the microwave cavity, and a part located downstream from the microwave cavity.

7. The apparatus according to claim 6, wherein the tube located inside the microwave cavity is made of quartz.

8. The apparatus according to claim 6, wherein the tube parts located upstream and downstream from the microwave cavity are joined to the tube part located inside the microwave cavity through a mechanical junction.

9. The apparatus according to claim 1, wherein the power of the microwave generator is of 10-20 kW.

10. The apparatus according to claim 1, comprising a receptacle to collect the powder spheroids exiting the plasma tube, and a filter for the gas exiting the receptacle, the filter being configured to intercept the powder exiting the receptacle carried by the gas, thus allowing to reuse the gas exiting the filter as process gas.

11. A method to make spheroids from a powder precursor by a microwave-induced plasma, comprising the step of forming a plasma torch in a plasma tube by coupling a process gas flow with a microwave radiation, and further comprising the steps of:
  carrying the powder precursor into the plasma torch by means of the process gas acting as a carrier gas, in order to make spheroids from the powder precursor by in-flight melting; and
  cooling the plasma tube from outside by injecting compressed air into a microwave cavity that surrounds the plasma tube.

12. The method according to claim 11, wherein the compressed air is also injected into a waveguide leading to the microwave cavity.

13. The method according to claim 11, wherein the compressed air is also injected into a waveguide short circuit connected to the microwave cavity.

14. The method according to 11, wherein the compressed air is injected through at least one groove parallel to the axis of the plasma tube.

15. The method according to claim 11, wherein the power to form and maintain the plasma torch is of 10-20 kW.

16. An apparatus for powder spheroidisation by microwave-induced plasma, comprising a microwave generator, a microwave cavity, a waveguide connecting the microwave generator to the microwave cavity, a plasma tube partially located in the microwave cavity, a powder supply connected to the plasma tube to feed a powder precursor flow thereinto, a gas supply connected to the plasma tube to feed a process gas flow thereinto, in order to form a plasma torch in the plasma tube by coupling the process gas flow with a microwave radiation, a compressed air supply, and a waveguide short circuit connected to the microwave cavity, the waveguide short circuit comprising at least one opening for the compressed air so that the compressed air can cool the plasma tube from outside, the gas supply being connected to the powder supply to let the process gas carry the powder precursor into the plasma tube, and so into the plasma torch in order to make spheroids from the powder precursor by in-flight melting.

17. The apparatus according to claim 16, wherein the plasma tube is composed of at least three different tube parts, including a part located inside the microwave cavity, a part located upstream from the microwave cavity, and a part located downstream from the microwave cavity.

18. The apparatus according to claim 17, wherein the tube parts located upstream and downstream from the microwave cavity are joined to the tube part located inside the microwave cavity through a mechanical junction.

19. The apparatus according to claim 16, wherein the power of the microwave generator is of 10-20 kW.

20. The apparatus according to claim 16, comprising a receptacle to collect the powder spheroids exiting the plasma tube, and a filter for the gas exiting the receptacle, the filter being configured to intercept the powder exiting the receptacle carried by the gas, thus allowing to reuse the gas exiting the filter as process gas.

\* \* \* \* \*